United States Patent
Mezaael

(10) Patent No.: US 11,568,743 B2
(45) Date of Patent: Jan. 31, 2023

(54) SYSTEMS AND METHODS FOR MANAGING A VEHICLE FLEET BASED ON COMPLIANCE REGULATIONS

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 485 days.

(21) Appl. No.: 16/534,928

(22) Filed: Aug. 7, 2019

(65) Prior Publication Data

US 2021/0043087 A1 Feb. 11, 2021

(51) Int. Cl.
| | |
|---|---|
| G08G 1/00 | (2006.01) |
| G08G 1/127 | (2006.01) |
| H04L 9/06 | (2006.01) |
| B60N 2/02 | (2006.01) |
| G06Q 50/30 | (2012.01) |
| H04L 9/00 | (2022.01) |

(52) U.S. Cl.
CPC ........... *G08G 1/127* (2013.01); *B60N 2/0244* (2013.01); *G08G 1/202* (2013.01); *H04L 9/0643* (2013.01); *B60N 2002/0268* (2013.01); *B60N 2002/0272* (2013.01); *G06Q 50/30* (2013.01); *H04L 9/50* (2022.05)

(58) Field of Classification Search
CPC ...... G08G 1/127; G08G 1/202; B60N 2/0244; B60N 2002/0268; B60N 2002/0272; H04L 9/0643; H04L 2209/38; G06Q 50/30

USPC .............................................................. 701/1
See application file for complete search history.

(56) References Cited

U.S. PATENT DOCUMENTS

2016/0301698 A1* 10/2016 Katara ................. H04L 63/102
2017/0147959 A1* 5/2017 Sweeney ................ G08G 1/202
(Continued)

FOREIGN PATENT DOCUMENTS

WO 2018/232221 A1 12/2018

OTHER PUBLICATIONS

Kim, S. (2018). Blockchain for a Trust Network Among Intelligent Vehicles. pp. 1-26. 10.1016/bs.adcom.2018.03.010.

*Primary Examiner* — Tyler J Lee
*Assistant Examiner* — Tiffany P Ohman
(74) *Attorney, Agent, or Firm* — Brandon Hicks; Eversheds Sutherland (US) LLP

(57) ABSTRACT

Systems and methods are provided herein for managing a vehicle fleet based on compliance regulations, and, in some embodiments, involve blockchain or other distributed ledger technologies. Systems and methods for managing a vehicle fleet based on compliance regulations may include receiving a service request, wherein the service request is a request for a passenger ride or a request for a cargo transport, receiving first information for a first node, wherein the first information comprises a vehicle size, a vehicle weight, and/or a number of seats, receiving second information comprising a first threshold number of vehicle occupants and/or a first threshold vehicle occupant weight limit, determining that the first threshold number of vehicle occupants or the first threshold vehicle occupant weight limit are exceeded, and sending an indication that the first node has not accepted the service request.

16 Claims, 6 Drawing Sheets

(56) References Cited

U.S. PATENT DOCUMENTS

| | | |
|---|---|---|
| 2018/0117447 A1 | 5/2018 | Tran et al. |
| 2018/0259976 A1 | 9/2018 | Williams et al. |
| 2019/0025818 A1 | 1/2019 | Mattingly et al. |
| 2019/0258263 A1* | 8/2019 | Wendel ................. B60K 28/04 |
| 2020/0005559 A1* | 1/2020 | Grunbok, II .......... H04L 9/3239 |
| 2020/0139853 A1* | 5/2020 | Nawrocki ................ B60N 2/20 |
| 2020/0286020 A1* | 9/2020 | Kobayashi ....... G06Q 10/06312 |
| 2020/0394746 A1* | 12/2020 | Krishnamurthy .. G06K 9/00791 |

* cited by examiner

SYSTEMS AND METHODS FOR MANAGING A VEHICLE FLEET BASED ON COMPLIANCE REGULATIONS

TECHNICAL FIELD

The present disclosure relates to systems and methods for managing a vehicle fleet based on compliance regulations, and in some embodiments involve managing vehicle fleets in light of vehicle compliance regulations using blockchain technology.

BACKGROUND

Varying regions will often have compliance regulations, such as limits on the number of passengers allowed in a vehicle or limits in the weight of cargo or passengers a vehicle is allowed to transport.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
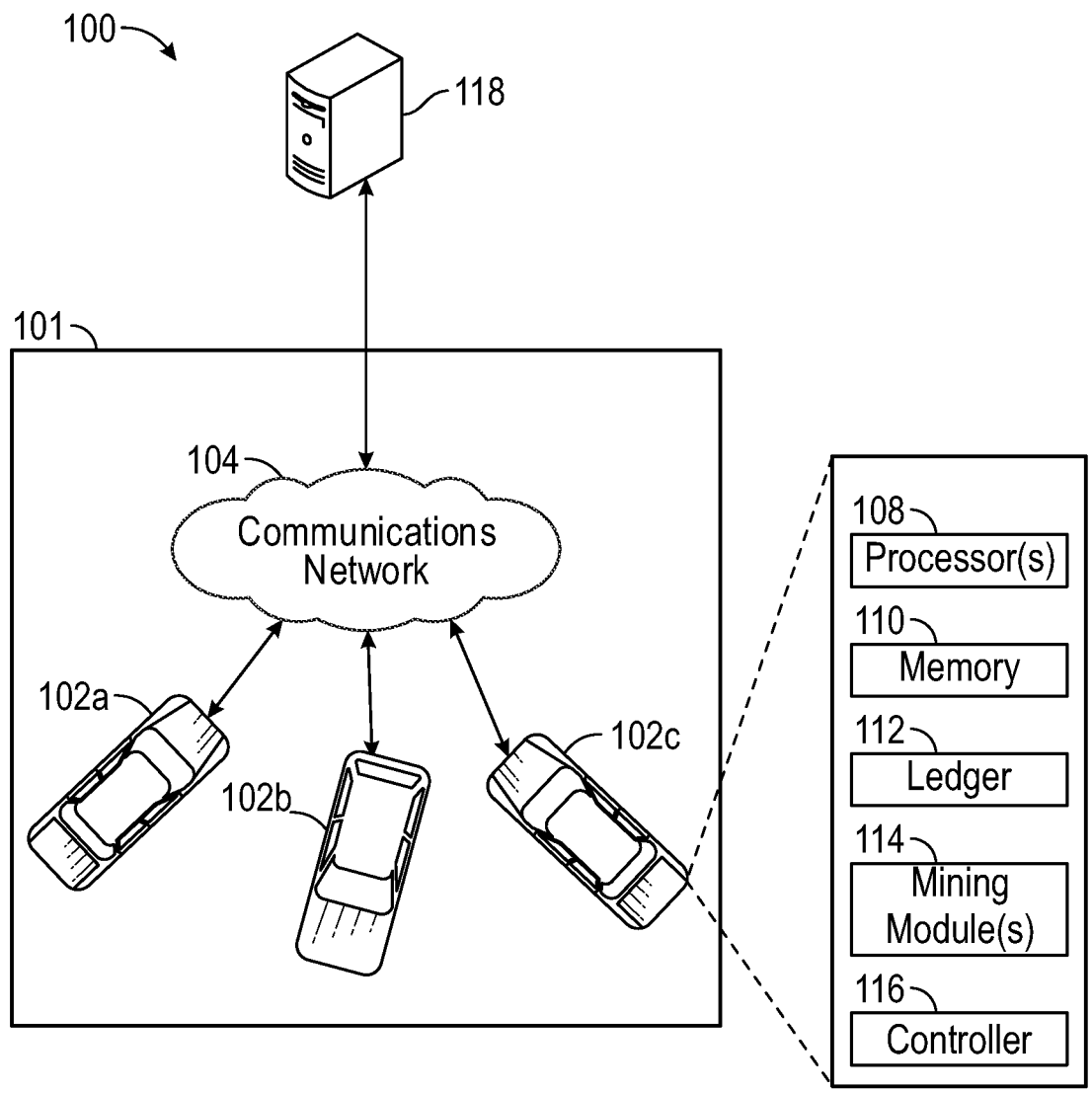
FIG. 1 depicts an illustrative architecture in accordance with one or more example embodiments of the disclosure.

The disclosure is directed to, among other things, systems and methods for managing a vehicle fleet network in light of varying compliance regulations. In certain embodiments, the vehicle fleet management may be implemented using blockchain or similar distributed ledger technologies. For example, each of the vehicles in the vehicle fleet may represent a node in a blockchain system, where each vehicle has access to, or stores, a decentralized, distributed ledger of information. The nodes in the blockchain system may not be limited to vehicles, but may also include, for example, user computers and other types of devices.

In some embodiments, the systems and methods disclosed herein can be configured to allow nodes (e.g., vehicles) in the vehicle fleet network to store information, where the information may be decentralized and distributed to each node's ledger, so that each vehicle has the same information. Such information may include compliance regulations for varying regions for different types of vehicles (e.g., a maximum number of passengers a particular type of vehicle is allowed to transport at once and/or maximum passenger or cargo weight limits for a given vehicle type), information about the vehicles in the vehicle fleet network (size, weight, type, features, VIN, etc.), information about particular users utilizing the vehicle fleet network (e.g., body weight of users, vehicle preferences, typical transportation routes, etc.), or any other information relevant to performing the operations of the vehicle fleet network.

In some embodiments, the vehicle fleet network may receive a service request, which may be in the form of a rideshare request or a request for a vehicle to transport cargo for a user, to name a few examples. Based on the request, the vehicle fleet network may determine a particular vehicle in the vehicle fleet network that may be able to provide service to the service requesting user. This determination may be made based on information such as the current status of the vehicles (e.g., if they are performing a service already, how many passengers and/or how much weight the vehicle is currently handling, etc.), the type of vehicles and features of the vehicles, any relevant compliance regulations for regions through which the service will take the vehicle (e.g., the vehicle may travel through region X with certain maximum passenger number limitations to region Y with certain other maximum passenger number limitations), etc. In determining whether a vehicle will become noncompliant with a region's regulations, the requesting user's body weight or cargo weight may be required as an input. This information may be received through any number of methods including, for example, manual input from the user, an automatic determination through external data sources (e.g., the information is already known and stored on a database on the vehicle ledgers), or sensors located on any of the vehicles in the vehicle fleet network. In the case of cargo transportation, weight information may also be inputted through the use of a scanner device that scans the items desired to be transported (e.g., bar code, computer vision image processing technology, etc.). Once weight information is initially provided, the information may be stored and distributed to vehicle ledgers for future use. In some instances, the user may be provided with incentives for providing their weight in reference to a service request, or even prior to a service request for storage on the vehicle ledgers. For example, the user may receive a credit towards a discount on service for providing this information to the vehicle fleet network. This may be because some users may be hesitant to provide their bodyweight, but the information is critical to the vehicle fleet network in making compliance determinations.

In some embodiments, the determination as to which particular vehicle will provide the service to the requesting user may made be made through mining operations performed by the vehicles in the vehicle fleet network. For example, mining operations may involve performing mathematical operations such as optimization functions to determine the best vehicle to perform the service request. In some embodiments, other nodes in the vehicle fleet network may also perform mining operations. For example, as previously mentioned, the nodes of the vehicle fleet network may include devices such as user computers, or other types of devices, servers, etc. These other types of nodes may also be able to perform mining operations in addition to, or alternatively to, the vehicles in the vehicle fleet network. This may have the added benefit of reducing computing requirements of the vehicles, and/or adding additional nodes and computing power to the vehicle fleet network for more effective optimization determinations. Additionally, these other types of nodes may also have stored the same ledgers as the vehicles in the vehicle fleet network, and thus may be privy to the same information.

In some embodiments, once a vehicle is selected as being able to perform the requested service for the user, the vehicle may perform adjustments accordingly. For example, if a user is requesting a passenger transportation service, the user may indicate certain preferences, such as air conditioning, music type, chair orientation, or any other particular feature. The vehicle may adjust its settings prior to arrival to pick up the passenger for their transport service. In some embodiments, the vehicle may also automatically determine adjustments without an indication from the requesting user. For example, the vehicle may have just completed a cargo transportation service, where a seat in the vehicle had to be placed in a downright position. The vehicle may receive a request for a passenger transportation service, and may then automatically adjust the same seat to an upright position to accommodate the passenger. The vehicle may also adjust other features such as the orientation of the chairs within the vehicle, air conditioning, music selection, or any other relevant features. Such adjustments may be made based on preferences indicated by the requesting user, or may be made automatically based on determinations by the vehicle and/or vehicle fleet network.

In some embodiments, the vehicle fleet network may monitor and manage vehicles in the vehicle fleet network even after services with a requesting user have been initiated. For example, if it is determined that a vehicle, while performing a service, transitions into a state that becomes noncompliant with any relevant regulations (e.g., the weight of the cargo/passengers being transported surpasses a threshold weight according to regulation, or the vehicle enters a new region with lower threshold regulations and thus becomes noncompliant), then the vehicle fleet network may cause the vehicle to cease performing service (or alternatively, the vehicle itself may identify that it is noncompliant and may cease service). In some cases, this may involve the vehicle cease performing the transport service, drive to the side of the road, and/or perform any other necessary operations to cease service. In some cases, the vehicle may still provide some functionality, such as air conditioning for passengers and/or refrigeration functionality for perishable cargo items, and/or any other necessary functionality.

In some embodiments, upon becoming noncompliant, the vehicle may also be removed or may be made invisible to the vehicle fleet network so that no users may request service from the vehicle until it becomes compliant. For example, the vehicle may be removed from the vehicle fleet network ledgers. As another example, the vehicle may remain on the ledgers, but the ledgers may indicate that the vehicle is unavailable because it is noncompliant. The noncompliant vehicle may remove itself and/or update the ledgers, the vehicle fleet network as a whole may do so, or another vehicle or node on the vehicle fleet network may do so. Once the vehicle becomes compliant, it may resume service and become visible to the network once again.

In some embodiments, the vehicle fleet management network may also perform operations to redistribute cargo and/or passengers to other vehicles in the network to ensure that the noncompliant vehicle becomes compliant (and the cargo and/or passengers reach their destination in a timely manner). For example, the vehicle fleet network may determine that the vehicle needs to reduce its passenger count by one, so the vehicle fleet network will determine another vehicle in the area that is able to perform the service for one of the passengers in the vehicle. The passenger may then switch to the newly determined vehicle so that the current vehicle becomes compliant and may resume service. These same operations may be performed by the vehicle individually. In order to determine alternative vehicles to perform the service, the same mining operations performed to initially identify a vehicle to provide service may be performed. Alternatively, the vehicle may communicate with other nearby vehicles using communication methods such as Vehicle-to-Vehicle (V2V), Vehicle-to-Infrastructure (V2I), Vehicle-to-Everything (V2X), and/or Dedicated Short Range Communications (DSRC) to identify another vehicle that can provide service to some of the passengers and/or cargo to help the vehicle become compliant again.

Illustrative Embodiments

Turning now to the drawings, FIG. 1 depicts an illustrative architecture 100 in which techniques and structures of the present disclosure may be implemented. The illustrative architecture 100 may include a vehicle fleet network 101 comprising a plurality of vehicles such as vehicles 102(a), 102(b), and 102(c), a communications network 104, and a server 118. The communications network 104 may include any one or a combination of multiple different types of networks, such as cable networks, the Internet, wireless networks, and other private and/or public networks. In some instances, the communications network 104 may include cellular, Wi-Fi, or Wi-Fi direct. In some embodiments, the network may involve communications between vehicles in the network and/or between vehicles in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used. In some embodiments, some functionalities disclosed herein can be executed by individual vehicles (e.g., 102(a)-102(c)) and/or other nodes (e.g., user mobile phones, computers, servers, etc.) in the vehicle fleet network 101. In other embodiments, some functionalities disclosed herein can be executed entirely by the vehicle fleet network 101 as a whole. In other embodiments, some functionalities disclosed herein can be executed cooperatively by individual vehicles and the vehicle fleet network 101 as a whole. In other embodiments, some functionalities disclosed herein can be executed by an external source, such as server 118.

In various embodiments, each of the vehicles (e.g., 102(a)-102(c)) of the vehicle fleet network 101 may be configured similarly and may generally be referred to as connected vehicles. For brevity, a single vehicle, such as vehicle 102(a) may be discussed in greater detail, but any discussion with respect to a single vehicle may similarly apply to any other vehicle, such as vehicle 102(b) and/or vehicle 102(c), for example. In general, the vehicle 102(a) comprises at least one or more processor(s) 108, memory 110, a ledger 112, one or more mining module(s) 114, and a controller 116.

In some embodiments, vehicle 102(a) may include one or more processors 108 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 110 as needed for execution. The processor 108 may be configured to execute the computer-executable instructions to cause various operations to be performed. Each processor 108 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 110 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 110 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The ledger 112 may be a decentralized and distributed information source that may be continuously updated, distributed and/or stored at vehicle 102(a), for example. All other nodes in the vehicle fleet network 101 may also have access to and/or have stored a similar ledger 112 so that all nodes (e.g., vehicles 102(a)-104(c)) may be apprised of the same ledger information at any given time. For example, the ledger 112 may include information about various vehicles' sizes, types, features, current service statuses (e.g., transporting one passenger to destination X in region Y), compliance regulation information for various regions, and any other relevant information for the operation of the vehicle fleet network 101. For example, the ledger 112 may indicate that vehicle 102(a) is a truck with capacity to seat four passengers, has massaging seats, and is currently transporting two passengers and 100 pounds worth of cargo to destination X through region Y with regulations requiring the vehicle to transport no more than three passengers at any given time.

The mining module(s) 114 may allow the vehicle 102(a) (or any other node type) to perform mining operations. For example, vehicle 102(a) may perform mining to determine which vehicles within the vehicle fleet network 101 may be able to satisfy any number of given service requests from users. The mining process, in some instances, may involve the mining module 114 performing mathematical operations to determine an optimized solution for providing service to the service requesting user (e.g., identifying which vehicle is the optimal vehicle for providing service to the user based on information such as vehicle type and features and the current status of the vehicle given compliance regulations for the relevant region, for example). Such operations may be performed by any of the vehicles (e.g., 102(a)) in the vehicle fleet network 101, or may be performed by other types of nodes, such as user computers, mobile devices, or an external server, such as server 118.

The controller 116 may allow the vehicle 102(a) to perform certain functions in response to receiving and accepting, as well as performing, a service request. For example, the vehicle (e.g., vehicle 102(a)) may receive an indication from a requesting user that the requesting user desires certain features during a ride, such as certain types of seats, certain orientation of seats, air conditioning temperature and level, etc. The controller 116 may serve to adjust these features prior to the user entering the vehicle.

The controller 116 may also automatically perform adjustments through determinations based on a type of service request, information about a user, a type of cargo, etc. For example, a seat may be in a downright position because the vehicle had just completed a cargo transport service, and a user requests a passenger transport service, so the controller 116 may preemptively place the seat in an upright position to accommodate the passenger. In some embodiments, the controller 116 may also allow the vehicle to perform certain operations while the vehicle is performing service. For example, the vehicle may be transporting a passenger when a determination is made that the vehicle is no longer in compliance with regional vehicle regulations (e.g., maximum allowed number of passengers or vehicle weight capacity) and the vehicle must cease service. In this case, the controller 116 may allow the vehicle to continue to provide necessary functions, such as air conditioning or cargo-related functionality, such as refrigeration for perishable items. The vehicle may also determine if other vehicles in the area are capable of servicing at least some of the users and/or cargo currently present in the noncompliant vehicle, so that passengers and/or cargo may be transitioned to other, compliant vehicles to continue service.

Server 118 may serve as an external data source for any of the vehicles (e.g., vehicle 102(a)) in the vehicle fleet network 101. For example, the server 118 may contain information about compliance regulations for varying regions, vehicle features and functionalities for specific vehicle types and/or specific vehicles (e.g., through the use of a VIN), information about users, such as their body-weight, or any other relevant information. This information may be accessed by, or shared with, vehicle ledgers 112. For example, to initially provide information to a ledger 112 when the ledger 112 does not already have the information.

Figure 2:
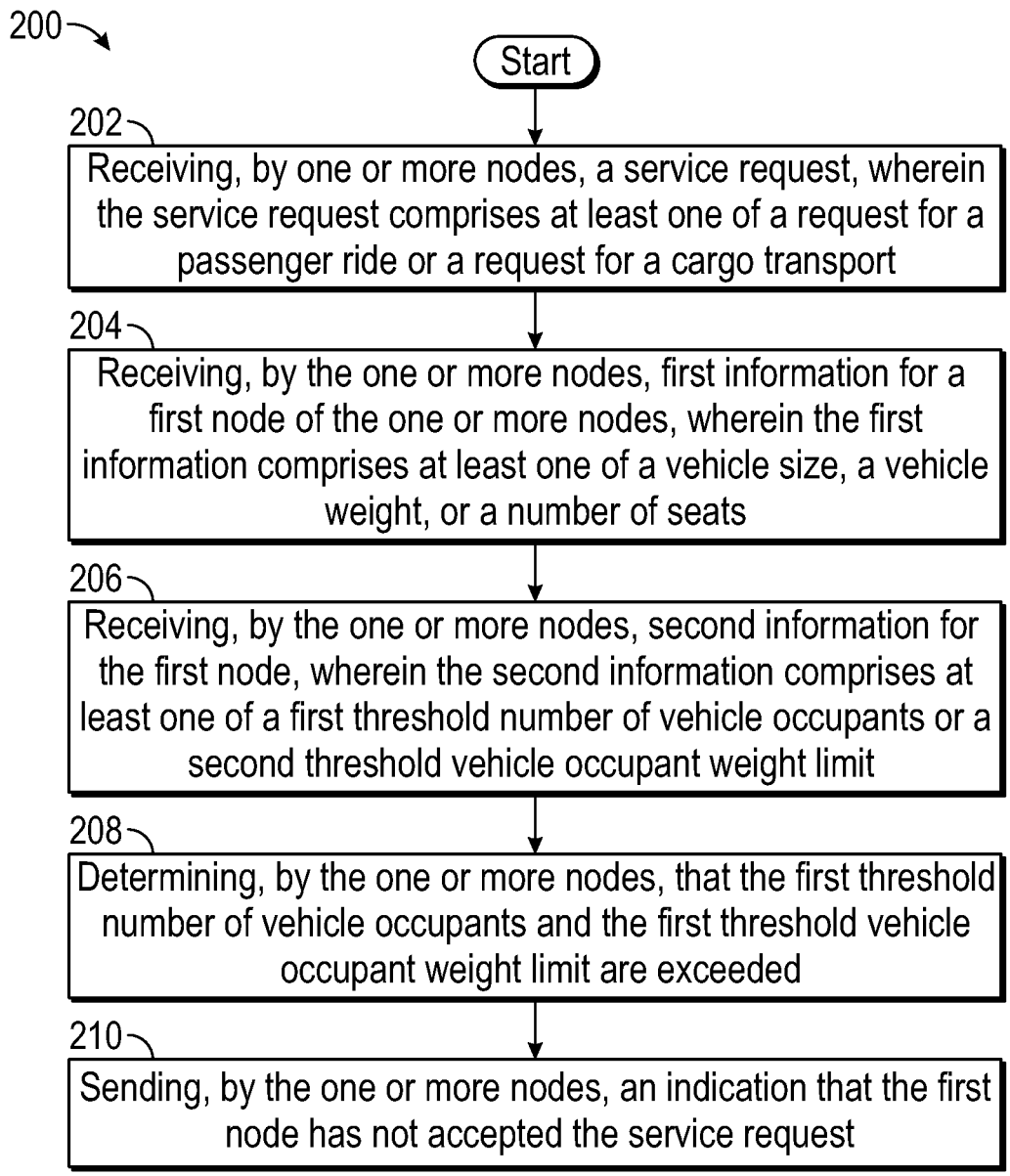
FIG. 2 is a flowchart of an example method in accordance with one or more example embodiments of the disclosure.

FIG. 2 is a flowchart of an example method of the present disclosure. In some embodiments, the method includes a step 202 of receiving a service request, wherein the service request comprises at least one of a request for a passenger ride or a request for a cargo transport. In some embodiments the service request may be received by one or more nodes. The one or more nodes may include one or more of the vehicles (e.g., 102(a)-102(c)) in a vehicle fleet network 101. The nodes may also include other devices, such as user computers, mobile phones, and or external servers, such as server 118, for example.

In some embodiments, the method includes a step 204 of receiving, by the one or more nodes, first information for a first node of the one or more nodes, wherein the first information comprises at least one of a vehicle size, a vehicle weight, or a number of seats. In some embodiments, the first information may also comprise a vehicle VIN, through which any of the aforementioned information or any other relevant vehicle information may be obtained (however, in some cases the VIN may not be necessary and the information may be determined directly). For example, a VIN for a truck may be received, which may allow the one or more nodes to perform a lookup to determine the vehicle information for the corresponding VIN. The information may be stored locally on a ledger that is decentralized and distributed to all nodes on the vehicle fleet network 101, or may be obtained from an external source, such as server 106. As an example, step 204 may involve one iteration of a process for determining whether a vehicle (e.g., 102(a)) in the vehicle fleet network 101 is able to accept and perform a service request, and is the best vehicle to perform the service request based on various factors like vehicle features and current status (e.g., current number of passengers in the vehicle, etc.). In this example, the one iteration may be determining whether one vehicle, truck A, is able to accept the service request. The first information may be information pertaining to truck A, such as the fact that truck A is a truck, has leather, massaging seats, Bluetooth audio capabilities, and is currently transporting zero passengers and no cargo, etc. In some instances, all of this information may be stored on each ledger 112 of each node of the vehicle fleet network 101. In some instances, only some information (such as vehicle VINs) may be stored, where each VIN is mapped to an external source of information (e.g., server 118) that contains all of the relevant information for that VIN. In some instances, any other combination of storage locations for this data may be possible.

In some embodiments, the one or more nodes may also receive weight information for a service requesting user, cargo, or any other users who will be involved in the requesting user's transportation request (e.g., one user is requesting the service, but has two other users with them that also want to be transported). The weight information may be used by the one or more nodes to make determinations as to whether a particular vehicle may be able to accept a passenger transportation service request based on relevant regional compliance regulations (e.g., a limit on the amount of passenger and/or cargo weight a vehicle may transport). This information may be received through any number of methods including, for example, manual input from the user, an automatic determination through external data sources (e.g., the information is already known and stored in an external server, such as server 118, or on the vehicle ledgers 112), or sensors located on any of the vehicles in the vehicle fleet network. In the case of cargo transportation, weight information may also be inputted through the use of a scanner device that scans the items desired to be transported (e.g., bar code, computer vision image processing technology, etc.). Once weight information is initially provided, the information may be stored and distributed to vehicle ledgers 112 for future use. In some instances, the user may be provided with incentives for providing their weight in reference to a service request, or even prior to a service request for storage on the vehicle ledgers. For example, the user may receive a credit towards a discount on service for providing this information to the vehicle fleet network. This may be because some users may be hesitant to provide their bodyweight, but the information is critical to the vehicle fleet network in making compliance determinations.

In some embodiments, the method can include a step 206 receiving, by the one or more nodes, second information for the first node, wherein the second information comprises at least one of a first threshold number of vehicle occupants or a second threshold vehicle occupant weight limit. The second information may pertain to vehicle compliance regulations for particular countries, regions, states, cities, etc. For example, in Singapore a passenger vehicle only is allowed four passengers max regardless of how many chairs are present in the vehicle. As another example, in some regions a given type of vehicle may only be allowed to carry a maximum weight of 850 pounds, which may include passenger and/or cargo weight individually or in combination. These compliance regulations may change depending on the region, and may depend on factors such as the type of vehicle and the purpose the vehicle is being used for (e.g., to transport passengers, to transport cargo, or to transport passengers and cargo).

In some embodiments, the method includes a step 208 of determining, by the one or more nodes, that the first threshold number of vehicle occupants and the first threshold vehicle occupant weight limit are exceeded. In some instances, this determination may indicate that the compliance regulation limits have been exceeded. For example, a regulation for a particular region may require that passenger vehicles carry no more than four passengers at a time. In this case the threshold number of vehicle occupants may be four, so the threshold would be exceeded if a fifth passenger were to enter the vehicle, or if a fifth passenger were to request service in a vehicle already carrying four passengers. In other examples, the same may be applied to weight limit regulations, as well as any other relevant vehicle compliance regulations. In some instances, a determination may also be made as to whether the compliance regulation threshold has not been exceeded, but instead has been exactly met.

In some embodiments, compliance determinations may be made the vehicle performing the service itself, may be made by the vehicle fleet network 101, or may be made by any other individual node (e.g., vehicle 102(a)) within the vehicle fleet network 101. This may be possible because all nodes (e.g., vehicle 102(a)) within the vehicle fleet network 101 has the same informational knowledge through the decentralized, distributed ledgers 112. Thus vehicle 102(b) will know that vehicle 102(a) is noncompliant because vehicle 102(a) and 102(b) may both have shared information.

In various embodiments, the method includes a step 210 of sending, by the one or more nodes, an indication that the first node has not accepted the service request. In some instances, a user performing a service request (e.g., rideshare request) may receive an indication that the particular vehicle will exceed compliance regulation limits if the passenger is to enter the vehicle, so the vehicle will not accept the passenger's service request. In some instances, the vehicle may simply be removed from contention for providing service to satisfy the user's service request, and the vehicle fleet network 101 may move on to determine if another vehicle is able to satisfy the service request. In some cases, this process may be performed iteratively until a vehicle that is able to satisfy the service request while complying with compliance regulations is found.

Figure 3:
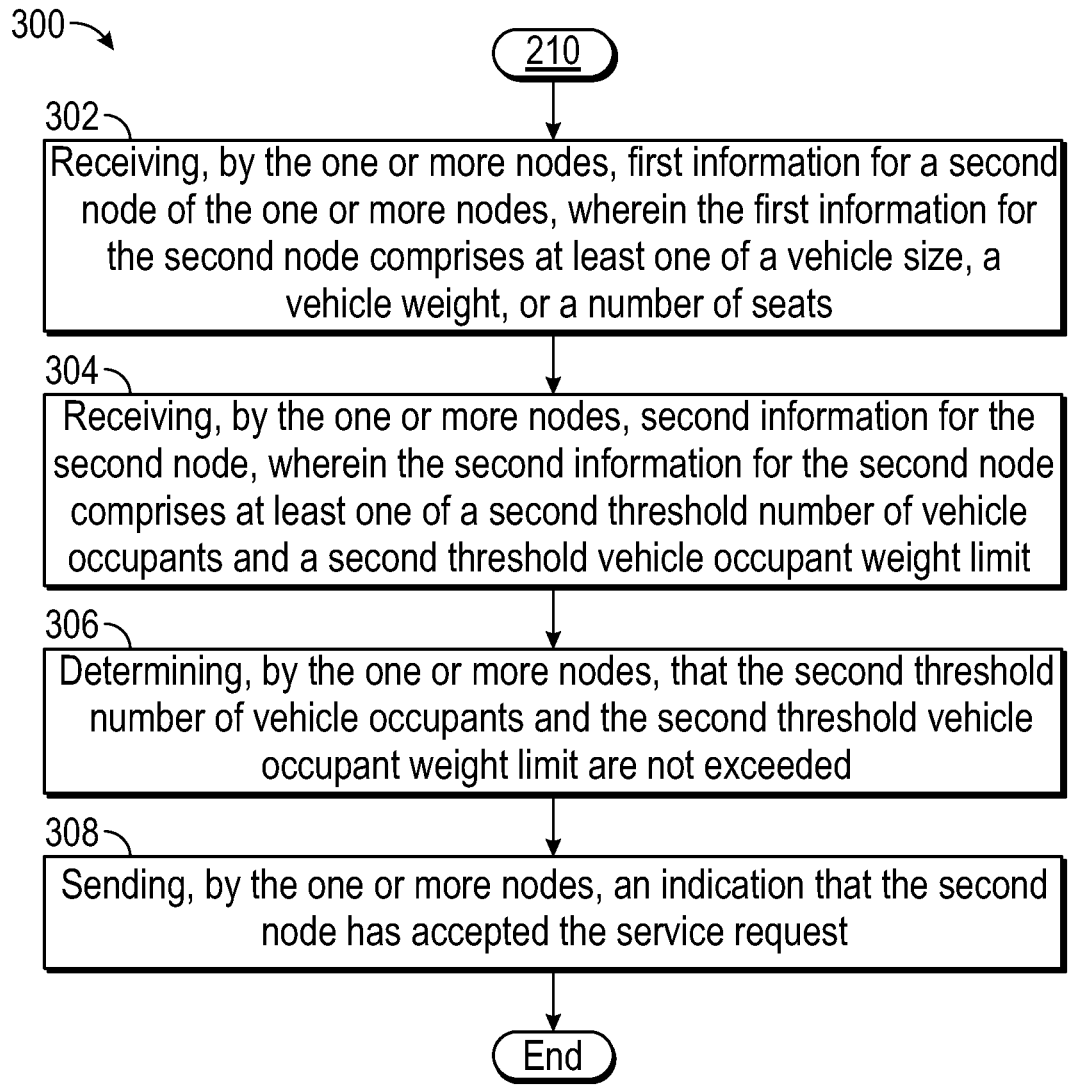
FIG. 3 is a flowchart of an example method in accordance with one or more example embodiments of the disclosure.

FIG. 3 is a flowchart of another example method of the present disclosure. FIG. 3 may be a logical continuation of the steps performed with respect to FIG. 2.

In some embodiments, the method includes a step 302 of receiving, by the one or more nodes, first information for a second node of the one or more nodes, wherein the first information for the second node comprises at least one of a vehicle size, a vehicle weight, or a number of seats. In some instances, step 302 may be performed when a first vehicle is unable to accept a service request because doing so would cause it to exceed thresholds pertaining to a compliance regulation for a given region (e.g., would result in the vehicle carrying more than the threshold number of passengers). The second node may be a second vehicle (e.g., vehicle 102(b)) in the vehicle fleet network 101.

In some embodiments, the method includes a step 304 of receiving, by the one or more nodes, second information for the second node, wherein the second information for the second node comprises at least one of a second threshold number of vehicle occupants and a second threshold vehicle occupant weight limit. In some cases, the second information for the second node may be the same information as the second information for the first node. This may be the case if the vehicle type is the same or the region is the same (e.g., the compliance regulations are the same). In some cases, however, the second information may be different if the vehicle type is different (e.g., a passenger sedan versus a van, truck, etc.) or the region has changed.

In some embodiments, the method includes a step 306 of determining, by the one or more nodes, that the second threshold number of vehicle occupants and the second threshold vehicle occupant weight limit are not exceeded. In some cases, this determination may indicate that the second node (e.g., second vehicle) may be able to satisfy the user's service request while still complying with any relevant compliance regulations. For example, if the maximum amount of passengers for the particular type of vehicle is four, and the vehicle is currently only transporting two passengers, then the vehicle will be able to satisfy the user's service request assuming only the one user will be entering the vehicle (e.g., the user does not have additional passengers that require transport as well).

In some embodiments, the method includes a step 308 of sending, by the one or more nodes, an indication that the second node has accepted the service request. This information may then be added to the ledgers 112 of all the nodes of the vehicle fleet network 101 so that the nodes are aware that the second node is performing the service for the user.

Figure 4:
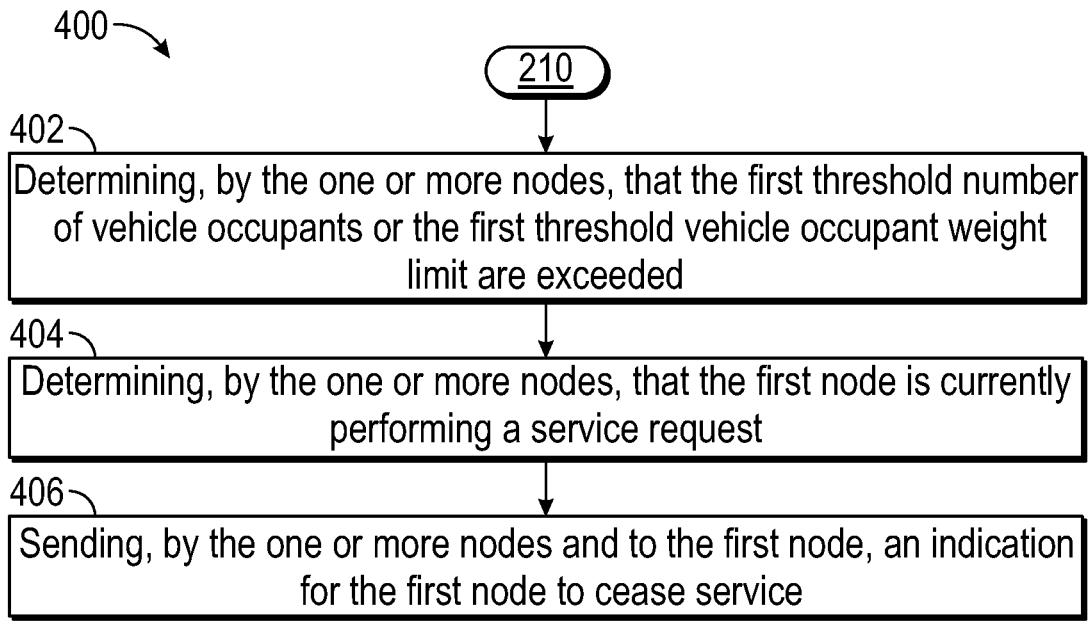
FIG. 4 is a flowchart of an example method in accordance with one or more example embodiments of the disclosure.

FIG. 4 is a flowchart of another example method of the present disclosure. FIG. 4 may be a logical continuation of the steps performed with respect to FIG. 2.

In some embodiments, the method comprises a step 402 of determining, by the one or more nodes, that the first threshold number of vehicle occupants or the first threshold vehicle occupant weight limit are exceeded. This scenario may arise, for example, if a vehicle transporting cargo is loaded with cargo that surpasses the threshold weight limit for the relevant compliance regulation. This scenario may also arise, as another example, if more than a threshold number of passengers enter into a vehicle (perhaps in a situation where one user requests service and additional users are present with the requesting user and attempt to enter the vehicle, thus surpassing the passenger number threshold). This scenario may also arise, as a third example, if the passenger number limit is not surpassed, but the passenger's weights are unknown and the combined passenger weight surpasses a vehicle weight limit as per relevant regulations. Any number of other scenarios may exist where compliance regulations are surpassed.

In some embodiments, the method comprises a step 404 of determining, by the one or more nodes, that the first node is currently performing a service request.

In some embodiments, the method comprises a step 406 of sending, by the one or more nodes and to the first node, an indication for the first node to cease service. In some instances, ceasing service may involve the vehicle ceasing to transport passengers and/or cargo, which may involve the vehicle pulling off to the side of the road or performing any other actions necessary for the vehicle to cease performing service. In some instances, the vehicle may continue to provide certain functionality. For example, the vehicle may continue to provide air conditioning to the passengers in the vehicle. If cargo is being transported, the vehicle may continue to provide any necessary functionality to maintain the products (e.g., refrigeration). In some instances, the vehicle (e.g., vehicle 102(*a*)) and/or the vehicle fleet network 101 may then perform operations to determine another vehicle (e.g., vehicle 102(*b*)) that is able to receive one or more of the passengers of vehicle 102(*a*) and/or enough cargo of vehicle 102(*a*) so that 102(*a*) returns to a compliant state and is able to resume service. In order to determine alternative vehicles to perform the service, the same mining operations performed to initially identify a vehicle to provide service may be performed. Alternatively, the vehicle may communicate with other nearby vehicles using communication methods such as Vehicle-to-Vehicle (V2V), Vehicle-to-Infrastructure (V2I), Vehicle-to-Everything (V2X), and/or Dedicated Short Range Communications (DSRC) to identify another vehicle that can provide service to some of the passengers and/or cargo to help the vehicle become compliant again.

In some embodiments, sending the indication for the first node to cease service may also involve the first node (e.g., vehicle) being removed as an option for other users performing service requests. For example, until the vehicle returns to a state of satisfying the relevant compliance regulations, the vehicle may be removed from or invisible to the vehicle fleet network 101.

Figure 5:
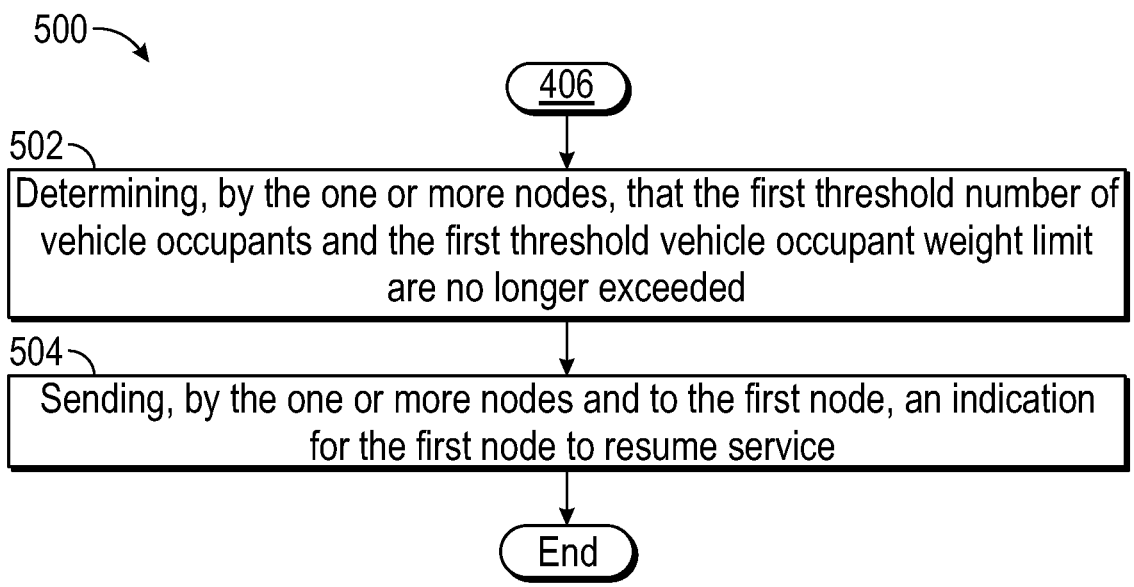
FIG. 5 is a flowchart of an example method in accordance with one or more example embodiments of the disclosure.

FIG. 5 is a flowchart of another example method of the present disclosure. FIG. 5 may be a logical continuation of the steps performed with respect to FIG. 4.

In some embodiments, the method comprises a step 502 of determining, by the one or more nodes, that the first threshold number of vehicle occupants and the first threshold vehicle occupant weight limit are no longer exceeded. For example, this may take place when the vehicle returns to an appropriate number of passengers, carrying weight, and/or any other regulation threshold according to the relevant compliance regulations.

In some embodiments, the method comprises a step 504 of sending, by the one or more nodes and to the first node, an indication for the first node to resume service. In some instances, this may involve the node (e.g., vehicle 102(*a*)) resuming passenger and/or cargo transport to the desired destinations.

Figure 6:
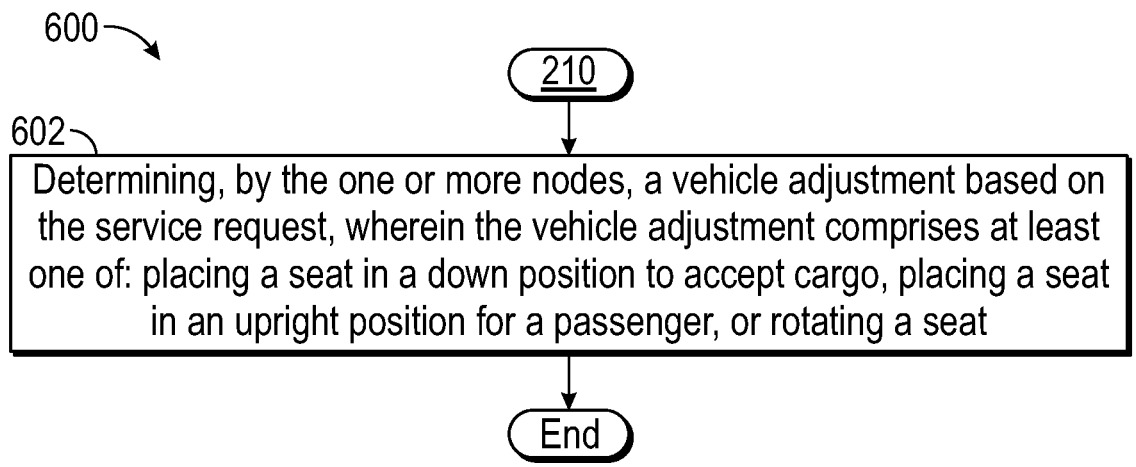
FIG. 6 is a flowchart of an example method in accordance with one or more example embodiments of the disclosure.

FIG. 6 is a flowchart of another example method of the present disclosure. FIG. 6 may be a logical continuation of the steps performed with respect to FIG. 2.

In some embodiments, the method comprises a step 602 of determining, by the one or more nodes, a vehicle adjustment based on the service request, wherein the vehicle adjustment comprises at least one of: placing a seat in a down position to accept cargo, placing a seat in an upright position for a passenger, or rotating a seat. The vehicle adjustments are not limited in scope to these adjustments; these are merely examples. Any other adjustment that the vehicle is able to perform would also be a possibility (e.g., music, air conditioning, dynamic window tint, to name a few examples). In some instances, the vehicle adjustment may be received as a parameter indicated by the user in the service request. For example, the user may request that a chair in the vehicle face a certain direction. In other instances, the vehicle adjustment may be automatically determined by the vehicle based on the type of service request received. For example, if a seat in the vehicle was placed in a downright position because the vehicle was previously transporting cargo, and the service request is for a passenger transport, then the vehicle may place the seat in an upright position for the passenger's use. Numerous other possible adjustment determinations may be made automatically or based on user indications.

Figure 7:
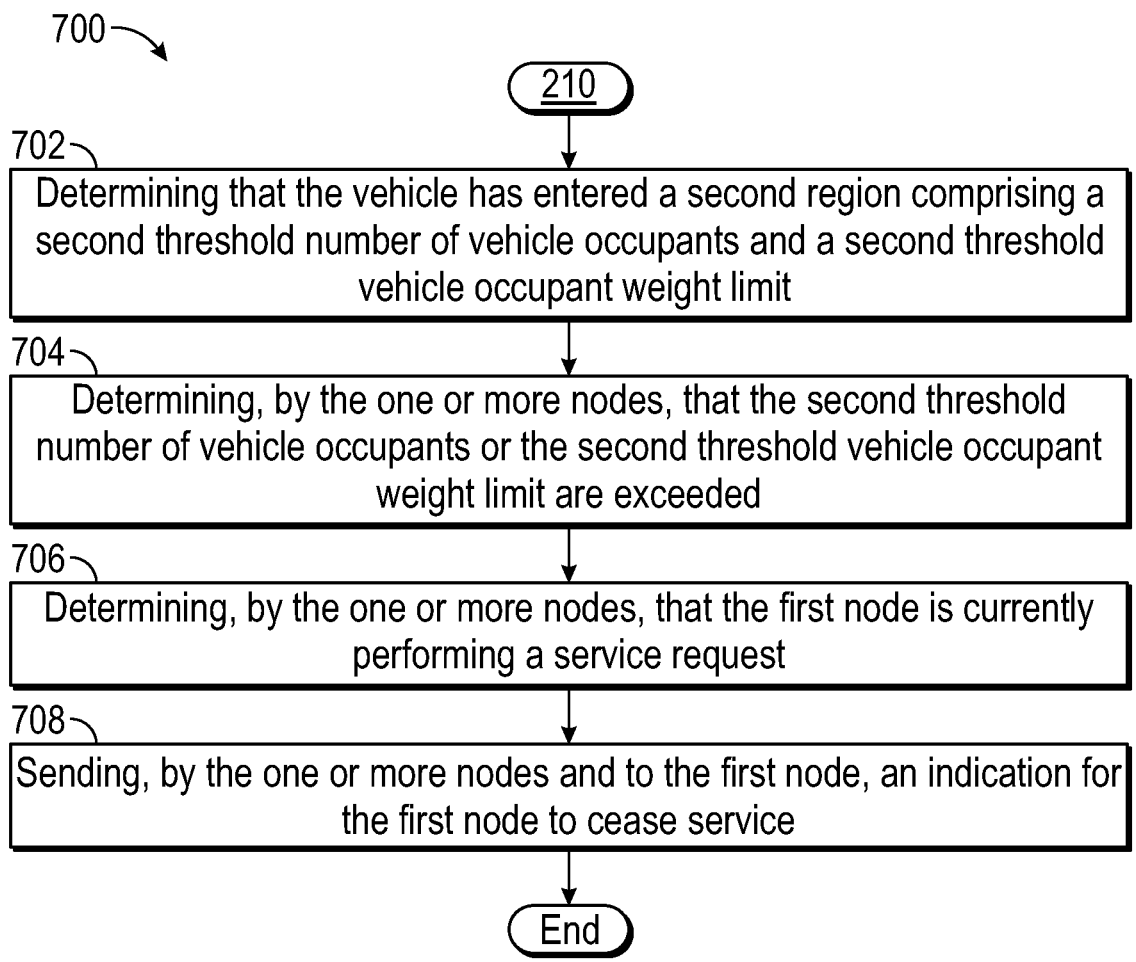
FIG. 7 is a flowchart of an example method in accordance with one or more example embodiments of the disclosure.

FIG. 7 is a flowchart of another example method of the present disclosure. FIG. 7 may be a logical continuation of the steps performed with respect to FIG. 2.

In some embodiments, the method comprises a step 702 of determining that the vehicle has entered a second region comprising a second threshold number of vehicle occupants and a second threshold vehicle occupant weight limit. For example, the vehicle may leave a region where the maximum amount of passengers allowed for a particular vehicle type is four and enter a region where the maximum amount of passengers allowed for the same vehicle type is five. The vehicle may reconsider whether it is complying with any relevant compliance regulations based on the compliance regulations of the new region it has entered. As described with references to step 708 below, if the vehicle determines that it is not satisfying the compliance regulations of the new region, it may cease service as it would if it were noncompliant in the region from which it came. The vehicle may also take such determinations into account when processing service requests. For example, a service request may indicate that a vehicle may need to transport passengers or cargo across two regions with two different compliance regulations. If the vehicle determines that accepting the service request will cause the vehicle to become noncompliant with either of or both of the compliance regulations at any point while providing the service, then the vehicle may deny the request.

In some embodiments, the method comprises a step 704 of determining, by the one or more nodes, that the second threshold number of vehicle occupants or the second threshold vehicle occupant weight limit are exceeded.

In some embodiments, the method comprises a step 706 of determining, by the one or more nodes, that the first node is currently performing a service request.

In some embodiments, the method comprises a step 708 of sending, by the one or more nodes and to the first node, an indication for the first node to cease service.

Figure 8:
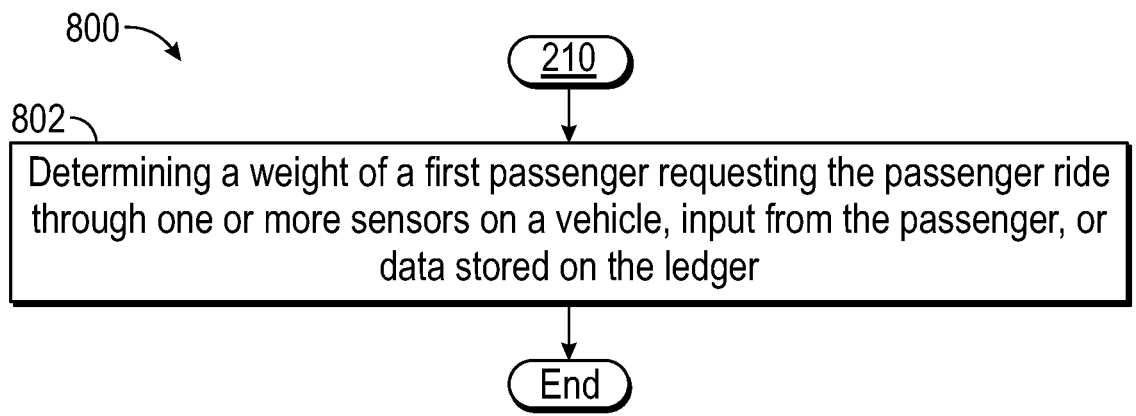
FIG. 8 is a flowchart of an example method in accordance with one or more example embodiments of the disclosure.

FIG. 8 is a flowchart of another example method of the present disclosure. FIG. 8 may be a logical continuation of the steps performed with respect to FIG. 2.

In some embodiments, the method comprises a step 802 of determining a weight of a first passenger requesting the passenger ride through one or more sensors on a vehicle, input from the passenger, or data stored on the ledger.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A fleet management system comprising:
   one or more nodes, wherein the one or more nodes comprise:
      at least one processor; and
      at least one memory storing computer-executable instructions, that when executed by the at least one processor, cause the at least one processor to:
         receive, by the one or more nodes associated with a blockchain, a service request, wherein the service request comprises at least one of a request for a passenger ride or a request for a cargo transport;
         receive, by the one or more nodes, first information for a first node of the one or more nodes, wherein the first information comprises at least one of a first vehicle size, a first vehicle weight, or a first number of seats;
         receive, by the one or more nodes, second information, wherein the second information comprises at least one of a first threshold number of vehicle occupants or a first threshold vehicle occupant weight limit, wherein both the first threshold number of vehicle occupants and the first threshold vehicle occupant weight limit are based on a regional compliance maximum, wherein the regional compliance maximum is a threshold value associated with a first geographical region;
         determine, by the one or more nodes, that the first threshold number of vehicle occupants or the first threshold vehicle occupant weight limit are not exceeded;
         send, by the one or more nodes, an indication that the first node has not accepted the service request;
         store the indication on a ledger associated with the blockchain;
         automatically determine, by the one or more nodes, a vehicle adjustment based on a type of the service request, wherein the vehicle adjustment comprises at least one of: placing a seat in a down position to accept cargo, placing a seat in an upright position for a passenger, or rotating a seat;
         adjust a component of the first node based on the vehicle adjustment;
         determine, by the one or more nodes, that the first threshold number of vehicle occupants or the first threshold vehicle occupant weight limit are exceeded during performance of a service associated with the service request by a first number of vehicle occupants or a first amount of weight;
         send, by the one or more nodes and to the first node, an indication for the first node to cease service, wherein ceasing service comprises automatically pulling the first node to a side of a road; and
         cause, based on the determination that the first threshold number of vehicle occupants or the first threshold vehicle occupant weight limit are exceeded during performance of a service, a change to the ledger, the change including at least one of: removing the first node from the ledger or indicating that the first node is unavailable for service.

2. The system of claim 1, wherein the computer-executable instructions further cause the at least one processor to:
   receive, by the one or more nodes, first information for a second node of the one or more nodes, wherein the first information for the second node comprises at least one of a second vehicle size, a second vehicle weight, or a second number of seats;
   receive, by the one or more nodes, second information for the second node, wherein the second information for the second node comprises at least one of a second threshold number of vehicle occupants and a second threshold vehicle occupant weight limit;

determine, by the one or more nodes, that the second threshold number of vehicle occupants and the second threshold vehicle occupant weight limit are not exceeded; and send, by the one or more nodes, an indication that the second node has accepted the service request.

3. The system of claim 1, wherein both the first threshold number of vehicle occupants and the first threshold vehicle occupant weight limit are also established by a user, wherein user-established threshold values are below the regional compliance maximum.

4. The system of claim 1, wherein the first information and second information are stored on a blockchain ledger stored at each of the one or more nodes, and wherein the nodes are vehicles.

5. The system of claim 4, wherein the computer-executable instructions further cause the at least one processor to:

determine a weight of a first passenger requesting the passenger ride through one or more sensors on a vehicle, input from the passenger, or data stored on the blockchain ledger.

6. The system of claim 1, wherein the computer-executable instructions further cause the at least one processor to:

determine a second node to service the first number of vehicle occupants or the first amount of weight;

determine, by the one or more nodes, that the first threshold number of vehicle occupants and the first threshold vehicle occupant weight limit are no longer exceeded; and send, by the one or more nodes and to the first node, an indication for the first node to resume service.

7. The system of claim 1, wherein the computer-executable instructions further cause the at least one processor to:

determine that the first node has entered a second region comprising a second threshold number of vehicle occupants and a second threshold vehicle occupant weight limit;

determine, by the one or more nodes, that the second threshold number of vehicle occupants or the second threshold vehicle occupant weight limit are exceeded;

determine, by the one or more nodes, that the first node is currently performing a service request; and send, by the one or more nodes and to the first node, an indication for the first node to cease service.

8. A fleet management method comprising:

receiving, by one or more nodes, a service request, wherein the service request comprises at least one of a request for a passenger ride or a request for a cargo transport;

receiving, by the one or more nodes associated with a blockchain, first information for a first node of the one or more nodes, wherein the first information comprises at least one of a first vehicle size, a first vehicle weight, or a first number of seats;

receiving, by the one or more nodes, second information for the first node, wherein the second information comprises at least one of a first threshold number of vehicle occupants or a first threshold vehicle occupant weight limit, wherein both the first threshold number of vehicle occupants and the first threshold vehicle occupant weight limit are based on a regional compliance maximum, wherein the regional compliance maximum is a threshold value associated with a first geographical region;

determining, by the one or more nodes, that the first threshold number of vehicle occupants and the first threshold vehicle occupant weight limit are not exceeded;

sending, by the one or more nodes, an indication that the first node has accepted the service request;

storing the indication on a ledger associated with the blockchain;

automatically determining, by the one or more nodes, a vehicle adjustment based on a type of the service request, wherein the vehicle adjustment comprises at least one of: placing a seat in a down position to accept cargo, placing a seat in an upright position for a passenger, or rotating a seat;

adjusting a component of the first node based on the vehicle adjustment;

determining, by the one or more nodes, that the first threshold number of vehicle occupants or the first threshold vehicle occupant weight limit are exceeded during performance of a service associated with the service request by a first number of vehicle occupants or a first amount of weight;

sending, by the one or more nodes and to the first node, an indication for the first node to cease service, wherein ceasing service comprises automatically pulling the first node to a side of a road; and causing, based on the determination that the first threshold number of vehicle occupants or the first threshold vehicle occupant weight limit are exceeded during performance of a service, a change to the ledger, the change including at least one of: removing the first node from the ledger or indicating that the first node is unavailable for service.

9. The method of claim 8, further comprising:

receiving, by the one or more nodes, first information for a second node of the one or more nodes, wherein the first information for the second node comprises at least one of a second vehicle size, a second vehicle weight, or a second number of seats;

receiving, by the one or more nodes, second information for the second node, wherein the second information for the second node comprises at least one of a second threshold number of vehicle occupants or a second threshold vehicle occupant weight limit;

determining, by the one or more nodes, that the second threshold number of vehicle occupants and the second threshold vehicle occupant weight limit are not exceeded; and sending, by the one or more nodes, an indication that the second node has accepted the service request.

10. The method of claim 8, wherein both the first threshold number of vehicle occupants and the first threshold vehicle occupant weight limit are either based on a regional compliance maximum or established by a user, wherein user-established threshold values are below the regional compliance maximum.

11. The method of claim 8, wherein the first information and second information are stored on a blockchain ledger stored at each of the one or more nodes, and wherein the nodes are vehicles.

12. The method of claim 11, further comprising:

determining a weight of a first passenger requesting the passenger ride through one or more sensors on a vehicle, input from the passenger, or data stored on the blockchain ledger.

13. The method of claim 8, further comprising:

determining a second node to service the first number of vehicle occupants or the first amount of weight;

determine, by the one or more nodes, that the first threshold number of vehicle occupants and the first threshold vehicle occupant weight limit are no longer exceeded; and sending, by the one or more nodes and to the first node, an indication for the first node to resume service.

14. The method of claim 8, further comprising:

determining that the first node has entered a second region comprising a second threshold number of vehicle occupants and a second threshold vehicle occupant weight limit;

determining, by the one or more nodes, that the second threshold number of vehicle occupants or the second threshold vehicle occupant weight limit are exceeded;

determining, by the one or more nodes, that the first node is currently performing a service request; and sending, by the one or more nodes and to the first node, an indication for the first node to cease service.

15. A non-transitory computer-readable medium storing computer-executable instructions, that when executed by at least one processor, cause the at least one processor to:

receive, by one or more nodes associated with a blockchain, a service request, wherein the service request comprises at least one of a request for a passenger ride and a request for a cargo transport;

receive, by the one or more nodes, first information for a first node of the one or more nodes, wherein the first information comprises at least one of a first vehicle size, a first vehicle weight, or a first number of seats;

receive, by the one or more nodes, second information for the first node, wherein the second information comprises at least one of a first threshold number of vehicle occupants or a first threshold vehicle occupant weight limit, wherein both the first threshold number of vehicle occupants and the first threshold vehicle occupant weight limit are based on a regional compliance maximum, wherein the regional compliance maximum is a threshold value associated with a first geographical region;

determine, by the one or more nodes, that the first threshold number of vehicle occupants and the first threshold vehicle occupant weight limit are exceeded;

send, by the one or more nodes, an indication that the first node has not accepted the service request;

store the indication on a ledger associated with the blockchain;

automatically determine, by the one or more nodes, a vehicle adjustment based on a type of the service request, wherein the vehicle adjustment comprises at least one of: placing a seat in a down position to accept cargo, placing a seat in an upright position for a passenger, or rotating a seat;

adjust a component of the first node based on the vehicle adjustment;

determine, by the one or more nodes, that the first threshold number of vehicle occupants or the first threshold vehicle occupant weight limit are exceeded during performance of a service associated with the service request by a first number of vehicle occupants or a first amount of weight;

send, by the one or more nodes and to the first node, an indication for the first node to cease service, wherein ceasing service comprises automatically pulling the first node to a side of a road; and cause, based on the determination that the first threshold number of vehicle occupants or the first threshold vehicle occupant weight limit are exceeded during performance of a service, a change to the ledger, the change including at least one of: removing the first node from the ledger or indicating that the first node is unavailable for service.

16. The computer-readable medium of claim 15, wherein the computer-executable instructions further cause the at least one processor to:

receive, by the one or more nodes, first information for a second node of the one or more nodes, wherein the first information for the second node comprises at least one of a second vehicle size, a second vehicle weight, or a second number of seats;

receive, by the one or more nodes, second information for the second node, wherein the second information for the second node comprises at least one of a second threshold number of vehicle occupants or a second threshold vehicle occupant weight limit;

determine, by the one or more nodes, that the second threshold number of vehicle occupants and the second threshold vehicle occupant weight limit are not exceeded; and send, by the one or more nodes, an indication that the second node has accepted the service request.

* * * * *